United States Patent
Wakao (10) Patent No.: US 8,869,618 B2
(45) Date of Patent: Oct. 28, 2014

(54) METHOD AND APPARATUS FOR ESTIMATING CONTACT PATCH SHAPE OF TIRE

(75) Inventor: Yasumichi Wakao, Kodaira (JP)

(73) Assignee: Kabushiki Kaisha Bridgestone, Tokyo (JP)

(*) Notice: Subject to any disclaimer, the term of this patent is extended or adjusted under 35 U.S.C. 154(b) by 324 days.

(21) Appl. No.: 13/394,735

(22) PCT Filed: Sep. 1, 2010

(86) PCT No.: PCT/JP2010/064881
§ 371 (c)(1),
(2), (4) Date: Mar. 7, 2012

(87) PCT Pub. No.: WO2011/030700
PCT Pub. Date: Mar. 17, 2011

(65) Prior Publication Data
US 2012/0167687 A1 Jul. 5, 2012

(30) Foreign Application Priority Data
Sep. 8, 2009 (JP) .................. 2009-207420

(51) Int. Cl.
*G01M 17/02* (2006.01)
*B60C 23/06* (2006.01)
*B60C 11/03* (2006.01)
*B60T 8/172* (2006.01)

(52) U.S. Cl.
CPC ........... *B60C 23/065* (2013.01); *B60C 11/0332* (2013.04); *G01M 17/025* (2013.01); *B60T 8/1725* (2013.01)
USPC ............................................. 73/579; 73/146

(58) Field of Classification Search
USPC .................................................. 73/579, 146
See application file for complete search history.

(56) References Cited

U.S. PATENT DOCUMENTS 5,245,867 A * 9/1993 Sube et al. ...................... 73/146
5,596,141 A * 1/1997 Nishikawa et al. .......... 73/146.2
(Continued)

FOREIGN PATENT DOCUMENTS

| JP | 2004-359203 A | 12/2004 |
| JP | 2007-091144 A | 4/2007 |

(Continued)

OTHER PUBLICATIONS

Extended European Search Report, dated Mar. 27, 2013, issued in corresponding European Patent Application No. 10815297.6.
(Continued)

*Primary Examiner* — J M Saint Surin
(74) *Attorney, Agent, or Firm* — Sughrue Mion, PLLC (57) ABSTRACT

A simple method and apparatus for accurately estimating the contact patch shape of a moving tire. The vibration waveforms of a tire (20) with sipe rows (25A, 25B) formed at the respective pitches ($P_a$, $P_b$) in the left and right shoulder lands (24a, 24b) are detected by an acceleration sensor attached to a knuckle of the vehicle. Rotational order spectrums are obtained by performing a rotational order analysis on the vibration waveforms. The peak height ($Z_a$) of the rotational order ($n_a$) corresponding to the pitch ($P_a$) and the peak height ($Z_b$) of the rotational order ($n_b$) corresponding to the pitch ($P_b$) are extracted from the rotational order spectrums. The peak height ($Z_a$) is compared with the threshold value ($K_a$) to estimate whether the contact patch shape of the tire is longer than the contact patch length ($L_a$) of the tire contact patch shape ($F_a$) set as the use limit due to internal pressure drop or load increase, and the peak height ($Z_b$) is compared with the threshold value ($K_b$) to estimate whether it is shorter than the contact patch length ($L_b$) of the tire contact patch shape ($F_b$) set as the use limit due to internal pressure rise or load decrease.

13 Claims, 7 Drawing Sheets

(56) References Cited

U.S. PATENT DOCUMENTS

| | | | | |
|---|---|---|---|---|
| 6,510,733 | B2* | 1/2003 | Coe et al. | 73/146 |
| 7,032,436 | B2* | 4/2006 | Yokota et al. | 73/105 |
| 7,161,476 | B2* | 1/2007 | Hardman et al. | 340/442 |
| 7,370,523 | B2* | 5/2008 | Kitazaki et al. | 73/146 |
| 7,484,542 | B2* | 2/2009 | Sundkvist et al. | 152/209.18 |
| 8,122,762 | B2* | 2/2012 | Wakao | 73/146 |
| 8,437,905 | B2* | 5/2013 | Koguchi et al. | 701/29.1 |
| 2002/0162389 | A1 | 11/2002 | Yokota et al. | |
| 2005/0257870 | A1* | 11/2005 | Ohsawa et al. | 152/209.9 |
| 2007/0260376 | A1 | 11/2007 | Hattori | |
| 2009/0118891 | A1 | 5/2009 | Koguchi et al. | |

FOREIGN PATENT DOCUMENTS

| | | | |
|---|---|---|---|
| JP | 2008-273388 A | | 11/2008 |
| JP | 2009-214796 A | | 9/2009 |
| JP | 4387381 | * | 12/2009 |
| WO | WO 01/98123 A1 | | 12/2001 |
| WO | WO 2007/123196 A1 | | 11/2007 |

OTHER PUBLICATIONS

International Search Report PCT/JP2010/064881, Dec. 14, 2010.

* cited by examiner

TIRE CIRCUMFERENTIAL DIRECTION

TIRE AXIAL DIRECTION

METHOD AND APPARATUS FOR ESTIMATING CONTACT PATCH SHAPE OF TIRE

CROSS REFERENCE TO RELATED APPLICATIONS

This application is a National Stage of International Application No. PCT/JP2010/064881 filed Sep. 1, 2010, claiming priority based Japanese Patent Application No. 2009-207420, filed Sep. 8, 2009, the contents of all of which are incorporated herein by reference in their entirety.

TECHNICAL FIELD

The present invention relates to a method and an apparatus for estimating the contact patch shape of a moving tire.

BACKGROUND ART

Improper internal pressure of a tire causes a drop in running safety of the vehicle. Therefore, there have been methods for monitoring the internal pressure of moving tires by the use of pressure sensors. A problem with them, however, has been the expensive price of the pressure sensors, which can run up the cost of the monitoring system.

In response to it, there are methods proposed for estimating the internal pressure of a tire based on load signals produced by measuring the load with a load measuring apparatus incorporated into the wheel bearing (see Patent Document 1, for instance).

Also, there are methods proposed for detecting the forces working on the tread from the road surface using a sheet-like surface pressure sensor having substantially the same width as the tread of the tire which consists of a plurality of piezoelectric elements arranged in a matrix inside the tread. This surface pressure sensor provided over the whole circumference of a tire can measure the pressure distribution on the surface of the tire tread, thus enabling accurate estimation of the contact patch shape of the tire (see Patent Document 2, for instance).

PRIOR ART DOCUMENT

Patent Document

Patent Document 1: Japanese Unexamined Patent Application Publication No. 2007-91144
Patent Document 2: Japanese Unexamined Patent Application Publication No. 2004-359203

SUMMARY OF THE INVENTION

Problem to be Solved by the Invention

However, the load measuring apparatus disclosed in Patent Document 1 above has a complex structure of a bearing unit having an encoder and three sensors mounted on the peripheral surface of the encoder thereon. Therefore, difficult installation and added weight on the wheel section have been a problem with the apparatus.

Likewise, the method for estimating the contact patch shape of a tire using the sheet-like surface pressure sensor, as disclosed in Patent Document 2, cannot be considered a practical method, because the use of a large number of piezoelectric elements not only raises the cost but also requires a complex arithmetic device for estimating the contact patch shape of the tire.

The present invention has been made to solve the above-described problems, and an object thereof is to provide a simple method and apparatus for accurately estimating the contact patch shape of a moving tire.

Means for Solving the Problem

With a tire having sipes in the tread, tread vibrations occur along with tire rotation when the sipes are located within the contact patch (footprint). Through a painstaking investigation, the inventor has conceived of this invention upon realizing that the contact patch shape of a moving tire can be estimated accurately by detecting the amplitude of vibrations of the tire if it has sipes at a regular pitch along its circumference.

Thus, in a first aspect of the present invention, a method for estimating the contact patch shape of a tire comprises the steps of detecting vibrations of the tire which has a circumferential row of recesses in the tire tread arranged at the same pitch as a predetermined contact patch length, extracting vibration components corresponding to the pitch from the vibrations of the tire, and estimating the contact patch shape of the tire from the amplitude of the vibration components.

The predetermined contact patch length may be, for example, the contact patch length at normal internal pressure and normal load, the contact patch length set as the use limit due to internal pressure drop or load increase, or the contact patch length set as the use limit due to internal pressure rise or load decrease.

The recesses may be sipes or grooves provided in the land portion of the tire or indents provided in the ribs (grooves open to a circumferential groove). Or they may be lateral grooves defining blocks.

Provision of a circumferential row of recesses in the tire tread arranged at the same pitch as a predetermined contact patch length causes tread vibrations along with the rotation of the tire on account of this circumferential cyclical pattern. The larger the size of each of the recesses constituting the cyclical pattern, the greater the vibration intensity of each recess will be, and the smaller it is, the lower the vibration intensity of each recess will be.

In the present invention, the contact patch shape of a tire is estimated by setting the size of the recess and the pitch (cycle) of the recesses such that a larger vibration is produced when the pattern cycle is about the contact patch length despite the small vibration intensity of the recesses alone. As a measure for the small vibration intensity of the recesses alone, it is preferable that the length of the recess is 2 to 3 times the depth of the groove.

The reason for a larger vibration when the pattern pitch is about the same as the contact patch length is that the vibration in a moving tire is magnified when the deformation due to the cyclic pattern is synchronized with the leading edge and the trailing edge of the contact patch where the deformation of the tread is large. Conversely, when the difference between the pattern pitch and the contact patch length is large, the vibrations are caused by the recesses alone with the result that the vibration intensity is smaller.

Therefore, when the vibration component corresponding to the pattern pitch becomes large, it can be determined that the contact patch length has become the same length as the pattern patch. And when the vibration component becomes small, it can be determined that the contact patch length is widely deviating from the pattern patch.

The contact patch shape of a tire can be significantly affected by the tire internal pressure and the load.

When the internal pressure rises or when the load decreases, the contact patch area shrinks, thereby causing the gripping force of the tire to drop.

On the other hand, when the internal pressure drops or when the load increases, the contact patch area expands to increase the distortion of the tire, thus shortening the life of the tire.

Figure 12:
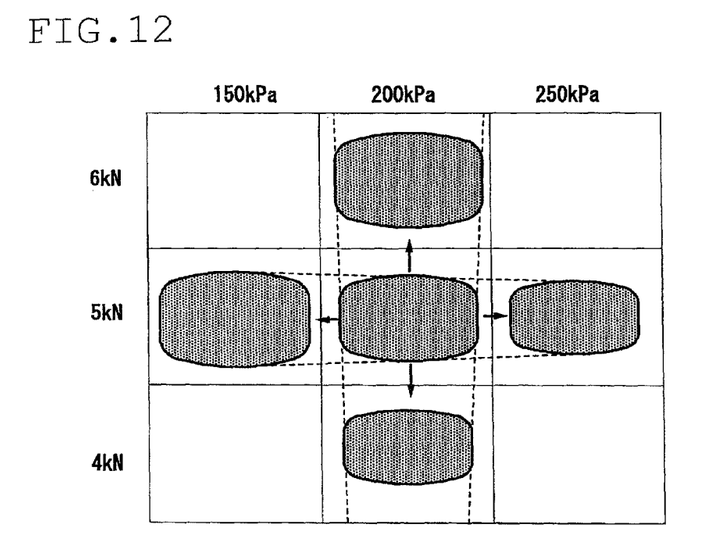
FIG. 12 is a diagram showing the relations between the tire internal pressure and load and the tire contact patch shape.

As shown by the contact patch models in FIG. 12, the contact patch shape of a tire shows similar tendencies between the case of the internal pressure rising and the case of the load decreasing. Also, it shows similar tendencies between the case of the internal pressure dropping and the case of the load increasing.

Therefore, as with the present invention, it is possible to determine whether the tire is in an excellent condition or not by monitoring the factor, such as the contact patch length, that reflects the contact patch shape of the tire.

In a second aspect of the present invention, there is provided a method for estimating the contact patch shape of a tire, in which the distance between the row of recesses and the center of tire width is wider than a half of the contact patch width at normal internal pressure and normal load and at the same time narrower than a half of a predetermined contact patch width at low internal pressure and high load. This makes it possible to determine whether the internal pressure of the tire has dropped below a predetermined internal pressure, whether the load has increased above a predetermined load, or whether the load is too heavy for the internal pressure.

The contact patch width $W_a$ at low internal pressure and high load is wider than the normal contact patch width $W_0$ which is the contact patch width at normal internal pressure and normal load. As the value of the contact patch width $W_a$ at low internal pressure and high load, it is not necessary to use the maximum contact patch width $W_M$ which is the contact patch width for the predetermined use limit due to internal pressure drop or load increase, but a value between the normal contact patch width $W_0$ and the maximum contact patch width $W_M$.

In a third aspect of the present invention, there is provided a method for estimating the contact patch shape of a tire, in which the distance between the row of recesses and the center of tire width is narrower than a half of the contact patch width at normal internal pressure and normal load and at the same time wider than a half of a predetermined contact patch width at high internal pressure and low load. This makes it possible to determine whether the internal pressure of the tire has risen above a predetermined internal pressure, whether the load has decreased below a predetermined load, or whether the internal pressure is too high for the load.

The contact patch width $W_b$ at high internal pressure and low load is narrower than the normal contact patch width $W_0$. As the value of the contact patch width $W_b$ at high internal pressure and low load, it is not necessary to use the minimum contact patch width $W_m$ which is the contact patch width for the predetermined use limit due to internal pressure rise or load decrease, but a value between the minimum contact patch width $W_m$ and the normal contact patch width $W_0$.

In a fourth aspect of the present invention, there is provided a method for estimating the contact patch shape of a tire, in which there are two or less recesses within a predetermined contact patch length. This is because if there are three or more recesses within the contact patch length, the resonance of vibrations will be brought about even when the deformation of the contact patch shape is small. Thus, the two or less recesses present within the predetermined contact patch length will help avoid unnecessary resonance, thus making it possible to accurately estimate the contact patch shape of a tire.

In a fifth aspect of the present invention, there is provided a method for estimating the contact patch shape of a tire, in which two rows of recesses having different pitch each other are provided at pitches different from each other. For example, the pitch of one of the recess rows may be set to the same value as the contact patch length set as the use limit due to internal pressure drop or load increase, and the pitch of the other of the recess rows may be set to the same value as the contact patch length set as the use limit due to internal pressure rise or load decrease. Then the contact patch shape can be detected whichever direction the contact patch shape of the tire may shift from one at normal internal pressure and normal load.

Also, the pitch of one of the recess rows may be set to the same value as the contact patch length at normal internal pressure and normal load, and the pitch of the other of the recess rows may be set to the same value as the contact patch length set as the use limit due to internal pressure drop or load increase. Then it is possible to detect the shift of the contact patch shape of the tire from one at normal internal pressure and normal load and the arrival at the use limit due to internal pressure drop or load increase, which requires special attention.

In a sixth aspect of the present invention, there is provided a method for estimating the contact patch shape of a tire, in which recesses of one of the recess rows are all located inside the contact patch and recesses of the other of the recess rows are all located outside the contact patch at normal internal pressure and normal load. As a result, the vibrations are weak at normal internal pressure and normal load, and strong vibrations can be detected when the contact patch shape has become larger or smaller. This will not only help ensure the running safety of a vehicle but also make it possible to accurately detect the contact patch shape approaching the use limit.

In a seventh aspect of the present invention, there is provided a method for estimating the contact patch shape of a tire, in which the recesses are circumferentially extending sipes formed in the shoulder region of the tire. This feature can surely strengthen the vibrations at the recesses when the pattern pitch gets close to the contact patch length.

In an eighth aspect of the present invention, there is provided a method for estimating the contact patch shape of a tire, in which the vibrations of the tire are detected at an unsprung portion of the vehicle. As a result, the state of the contact patch during a vehicular run can be estimated with accuracy without installing a sensor on the tire. Also, without the need to install the sensor on the tire, the production efficiency of the tire will improve. In addition, this will not only improve the durability of the sensor in comparison with the case where the sensor is installed on the tire, but also make the sensor change easier.

In a ninth aspect of the present invention, an apparatus for estimating the contact patch shape of a tire, which has a circumferential row of recesses in the tire tread arranged at the same pitch as a predetermined contact patch length, comprises a vibration detecting means installed on an unsprung portion of the vehicle for detecting the vibrations of the tire being transmitted thereto, a vibration components extracting means for extracting vibration components corresponding to the pitch from the vibrations of the tire, and a contact patch shape estimating means for estimating the contact patch shape of the tire based on the amplitude of the vibration components. The apparatus having a structure like this can realize accurate estimation of the state of the contact patch during a vehicular run without installing a sensor on the tire.

In a tenth aspect of the present invention, an apparatus for estimating the contact patch shape of a tire, which is one as described above, further comprises a determination means for determining abnormality of the contact patch shape of the tire by comparing the estimated shape of the contact patch with a predetermined standard shape of the contact patch and an alarm unit for emitting an alarm when the determination means has determined abnormality. This will ensure that the abnormality of the contact patch shape of the tire is determined reliably and the driver is warned of it by an alarm, thus improving the running stability of the vehicle.

In an eleventh aspect of the present invention, a method for estimating the contact patch shape of a tire comprises the steps of detecting vibrations of the tire which has a plurality of recess pairs in the tire tread, each pair composed of two recesses at the same interval as a predetermined contact patch length, the recess pairs arranged at a regular pitch along the tire circumference, extracting vibration components corresponding to the pitch of the recess pairs from the vibrations of the tire, and estimating the contact patch shape of the tire from the amplitude of the vibration components. Like this, provision of recess pairs at a regular pitch in the place of the recess row can also realize the estimation of the contact patch length of a moving tire. Thus it is possible to estimate the contact patch shape of a tire with accuracy.

In a twelfth aspect of the present invention, a method for estimating the contact patch shape of a tire comprises the steps of detecting vibrations of the tire which has recesses circumferentially arranged in the same positions as the predetermined edges of a contact patch in the tire tread at a regular pitch along the tire circumference, extracting vibration components corresponding to the pitch of the recesses from the vibrations of the tire, and estimating the contact patch shape of the tire from the amplitude of the vibration components. Thus, the contact patch width of a moving tire can be estimated, so that the contact patch shape of the tire can be estimated with accuracy.

It is to be understood that the foregoing summary of the invention does not necessarily recite all the features essential to the invention, and subcombinations of all these features are intended to be included in the invention.

BEST MODE FOR CARRYING OUT THE INVENTION

Hereinafter, the invention will be described based on preferred embodiments which do not intend to limit the scope of the claims of the present invention but exemplify the invention. And all of the features and the combinations thereof described in the embodiments are not necessarily essential to the invention.

Figure 1:
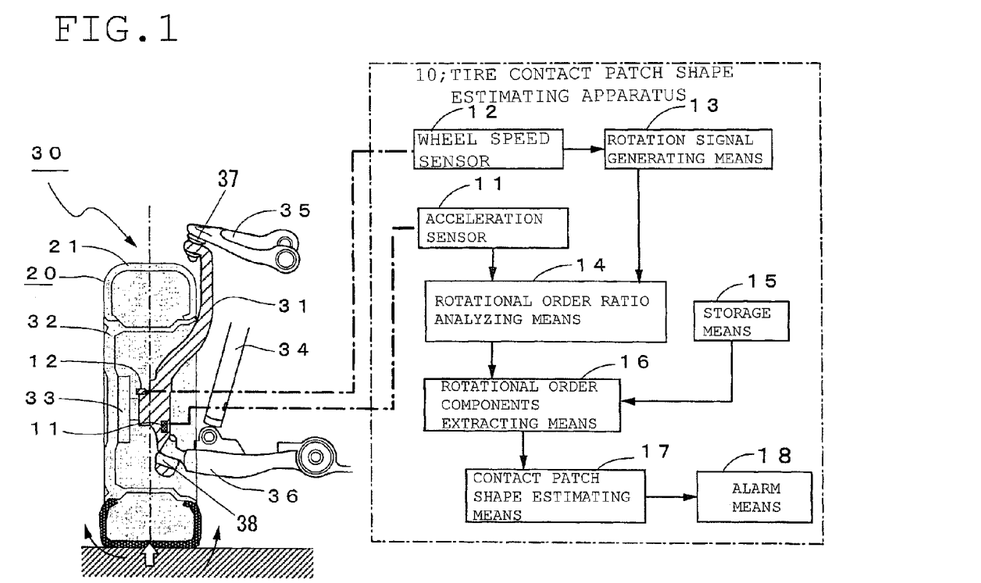
FIG. 1 is a functional block diagram showing a structure of a tire contact patch shape estimating apparatus according to a preferred embodiment of the invention.
Figure 2:
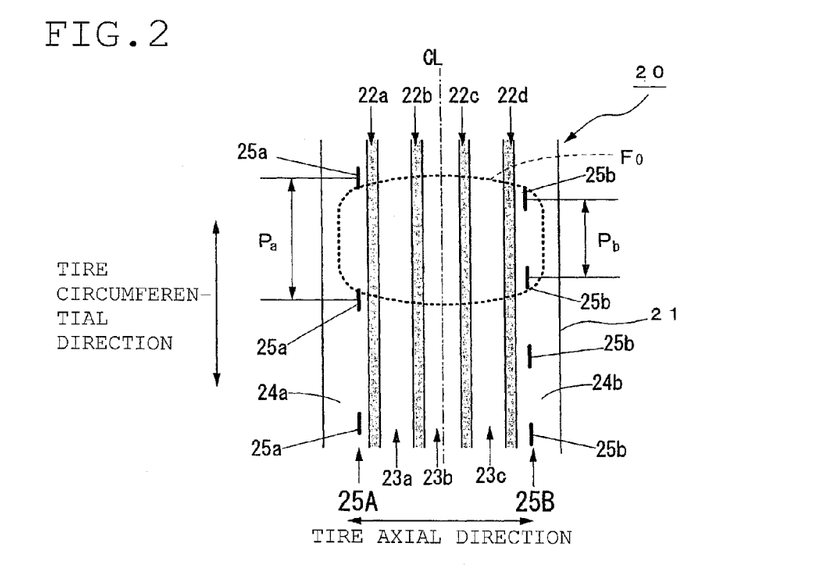
FIG. 2 is an illustration showing an example of a tread pattern of a tire having sipe rows formed at regular pitches according to the embodiment.

FIG. 1 is a functional block diagram showing a structure of a tire contact patch shape estimating apparatus 10 according to a preferred embodiment of the invention. FIG. 2 is an illustration showing an example of a tread pattern formed in the tread 21 of a tire 20 according to the present invention.

The tire contact patch shape estimating apparatus 10 includes an acceleration sensor 11 as a vibration detecting means, a wheel speed sensor 12 as a rotational speed detecting means, a rotation signal generating means 13, a rotational order ratio analyzing means 14, a storage means 15, a rotational order components extracting means 16, a contact patch shape estimating means 17, and an alarm means 18. The tire 20 has sipe rows 25A, 25B of sipes 25a, 25b, respectively, extending circumferentially about the tire, which are formed in the tread 21 of the tire 20 at the same pitches as predetermined contact patch lengths. The tire contact patch shape estimating apparatus 10 detects the vibrations of the tire 20, extracts vibration components corresponding to the above-mentioned pitches from the vibrations of the tire 20, and estimates the contact patch length of the tire 20 from the amplitude of the vibration components. At the same time, the tire contact patch shape estimating apparatus 10 gives an alarm in the form of sound, light, or display to the driver when the estimated contact patch length exceeds a predetermined range.

The tire 20, as illustrated in FIG. 2, has circumferential grooves 22a to 22d, which extend circumferentially about the tire, rib-shaped middle lands 23a, 23b, 23c, which are respectively defined by the circumferential grooves 22a, 22b, the circumferential grooves 22b, 22c, and the circumferential grooves 22c, 22d, and left and right shoulder lands 24a, 24b, which are located axially outside of the outermost circumferential grooves (shoulder grooves) 22a and 22d.

In the left and right shoulder lands 24a, 24b are circumferentially extending sipes 25a, 25b, respectively, which are arranged at the pitches $P_a$ and $P_b$, thus constituting sipe rows 25a, 25b respectively. Note that the region $F_0$ indicated by a bold broken line in the illustration shows a contact patch shape of the tire 20 at normal internal pressure and normal load. In this embodiment, the adjacent two sipes 25a, 25a of the sipe row 25A are both located outside the contact patch, and the adjacent two sipes 25b, 25b of the sipe row 25B are both located inside the contact patch.

Figure 3A:
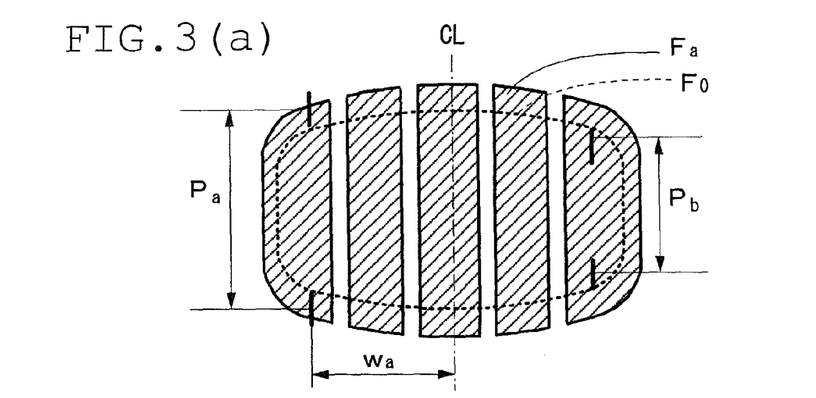
FIG. 3 are illustrations showing the relations between the contact patch shape of a tire and sipes.

More specifically, as illustrated in FIG. 3A, the sipe row 25A is arranged in a position a distance $w_a$ axially apart from the center line denoting the tire equatorial surface, toward the left of the illustration. The pitch $P_a$ of this sipe row 25A is set at the same value as the contact patch length $L_a$ of the tire contact patch shape $F_a$ which has been set as the use limit due to internal pressure drop or load increase.

Figure 3B:
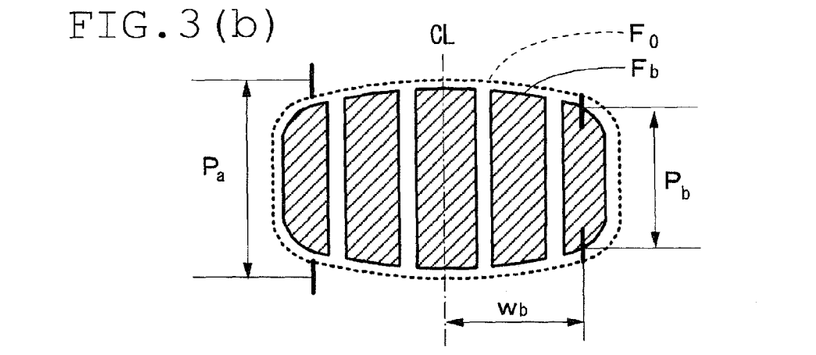

On the other hand, as illustrated in FIG. 3B, the sipe row 25B is arranged in a position a distance $w_b$ axially apart from the tire equatorial line CL toward the right of the illustration. The pitch $P_b$ thereof is set at the same value as the contact patch length $L_b$ of the tire contact patch shape $F_b$ which has been set as the use limit due to internal pressure rise or load decrease.

It goes without saying that the contact patch length $L_a$ is the contact patch length of the tire contact patch shape $F_a$ at the position a distance $w_a$ apart leftward from the tire equatorial line CL and the contact patch length $L_b$ is the contact patch length of the tire contact patch shape $F_b$ at the position a distance $w_b$ apart rightward from the tire equatorial line CL. Also, it is to be noted that $w_a=w_b$ in the present embodiment.

The acceleration sensor 11, which is attached to a knuckle 31 as shown in FIG. 1, detects the vibrations of the tire 20 (hereinafter referred to as tire vibrations) which are transmitted to the knuckle 31 via a wheel 32 and a wheel hub 33. The detecting direction of the acceleration sensor 11 is the axial (width) direction of the tire.

The knuckle 31 is a nonrotating-side member (unsprung member) of a wheel unit 30 which is coupled via a bearing to the wheel hub 33 rotating together with the wheel 32 with the tire 20 fitted thereon. And mounted on this knuckle 31 are a not-shown braking device and the like. The knuckle 31 is coupled to the upper and lower arms 35, 36 of the vehicle suspension having a suspension member 34, via shock-absorbing members 37, 38 such as rubber bushes.

If the acceleration sensor 11 is attached to a member, such as the upper and lower arms 35, 36, which are coupled to the wheel 32 via the shock-absorbing members 37, 38, the detection accuracy of the vibrations of the tread 21 will be compromised on account of the damper effect of the shock-absorbing members 37, 38. Hence, the vibrations transmitted to the unsprung portion of the vehicle from the tire 20 can be detected with higher accuracy by installing the acceleration sensor 11 on the wheel 32 side of the shock-absorbing members 37, 38 when it is attached to the unsprung portion of the vehicle.

The wheel speed sensor 12 detects the rotational speed of a wheel (hereinafter referred to as wheel speed). Employed in this embodiment to detect the rotational speed of the wheel is a wheel speed sensor of a known electromagnetic induction type, which has a rotor having gear teeth on its periphery and rotating together with the wheel, a yoke constituting a magnetic circuit in combination with the rotor, and a coil for detecting flux changes of the magnetic circuit. The yoke and the coil are mounted on the knuckle 31. It should be noted that the wheel speed sensor 12 that can be used may be one combining a ring multipolar magnet and a magnetoresistance element or of some other structure. Otherwise, the arrangement may be such that the rotational speed of a not-shown transmission is detected as the wheel speed.

The rotation signal generating means 13 generates and outputs a pulse signal that rises at the zero-cross point of output of the wheel speed sensor 12. The pulse number of the pulse signal generated per a single revolution of the tire is twice the number of gear teeth on the rotor or the number of magnetic poles of the ring multipolar magnet. Thus the wheel speed can be detected by counting the pulse number, and also the pulse signal outputted from the rotation signal generating means 13 can be used as a sampling clock. Since the sampling clock is synchronized with the rotational speed, sampling of tire vibrations detected by the acceleration sensor 11 by the use of the sampling clock realizes a constant number of samples per single revolution of the tire irrespective of the wheel speed. Viewed temporally, however, the faster the wheel speed is, the narrower the sampling interval will be, and the slower the wheel speed is, the wider the sampling interval will be.

Figure 4:
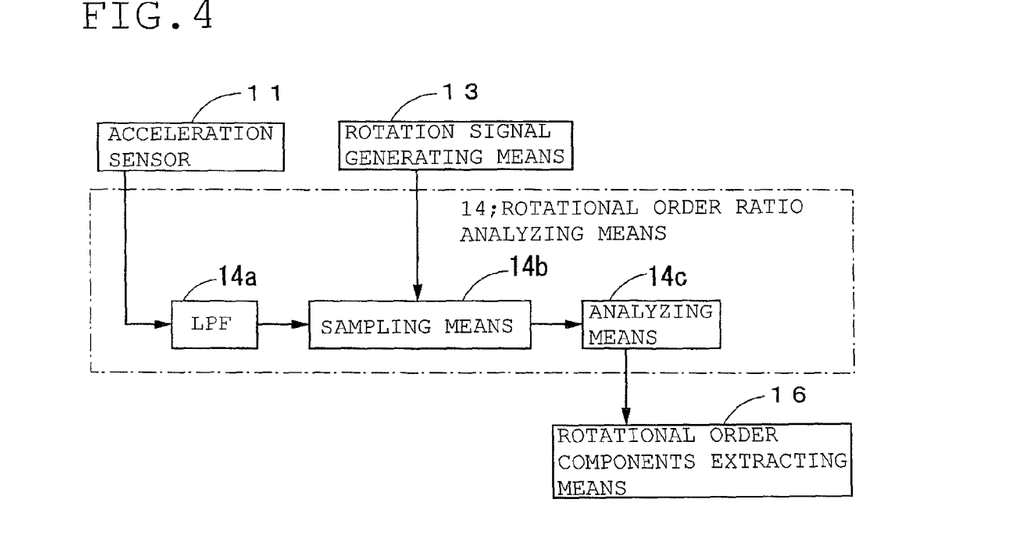
FIG. 4 is a functional block diagram showing a structure of a rotational order ratio analyzing means.

The rotational order ratio analyzing means 14, as shown in FIG. 4, includes a lowpass filter 14a, a sampling means 14b, and an analyzing means 14c.

The lowpass filter 14a not only removes high-frequency components from the tire vibrations detected by the acceleration sensor 11 but also prevents the occurrence of ailiasing in the rotational order ratio analysis.

The sampling means 14b samples tire vibrations detected by the acceleration sensor 11, using a sampling clock outputted by the rotation signal generating means 13.

The analyzing means 14c derives a vibration spectrum by performing an FFT processing on the vibration waveform of the thus sampled tire vibrations. While the horizontal axis of the vibration spectrum (frequency spectrum) of the vibration waveform measured at constant time intervals is frequency, the horizontal axis of the vibration spectrum of the vibration waveform measured at constant rotation intervals is rotational order n. This vibration spectrum will be hereinafter referred to as the rotational order spectrum.

The storage means 15 stores the rotational orders $n_a$ and $n_b$, which are used in the estimation of the contact patch shape of a tire, out of the rotational orders of tire vibrations corresponding to the pitch spectrums of the sipe rows 25A, 25B derived from the design of the tread pattern used for the tire 20 as illustrated in FIG. 2.

The rotational order components extracting means 16 extracts the vibration level of peaks corresponding to the pitch $P_a$ of the sipe row 25A and the vibration level of peaks corresponding to the pitch $P_b$ of the sipe row 25B from the rotational order spectrum obtained by the rotational order ratio analyzing means 14.

Formed in the left shoulder land 24a of the tread 21 of the tire 20 according to the present invention is the sipe row 25A whose pitch $P_a$ is set at the same value as the contact patch length $L_a$ of the tire contact patch shape $F_a$ which has been set as the use limit due to internal pressure drop or load increase. Therefore, as the contact patch shape of the tire 20 gets close to the tire contact patch shape $F_a$, one of the two adjacent sipes 25a, 25a of the sipe row 25A is located at the "leading edge" of the contact patch and the other thereof at the "trailing edge" thereof as illustrated in FIG. 3A. When, as mentioned above, the two sipes 25a, 25a are both located at the edges of the contact patch, which are susceptible to greater amounts of deformation, the tread 21 develops stronger vibration because the sipes 25a, causing small deformation alone, produces a large deformation due to the "leading edge" and "trailing edge" synchronization. Hence, as the contact patch shape nears the tire contact patch shape $F_a$, the vibration level of the vibrations of the rotational order $n_a$ corresponding to the pitch $P_a$ of the rotational order spectrum rises higher.

Similarly, formed in the right shoulder land 24b of the tread 21 is the sipe row 25B whose pitch $P_b$ is set at the same value as the contact patch length $L_b$ of the tire contact patch shape $F_b$ which has been set as the use limit due to internal pressure rise or load decrease. Therefore, as the contact patch shape of the tire 20 gets close to the tire contact patch shape $F_b$, one of the two adjacent sipes 25b, 25b of the sipe row 25B is located at the "leading edge" of the contact patch and the other thereof at the "trailing edge" thereof as illustrated in FIG. 3B. Hence, as the contact patch shape gets close to the tire contact patch shape $F_b$, the vibration level of the vibrations of the rotational order $n_b$ corresponding to the pitch $P_b$ of the rotational order spectrum rises higher.

Therefore, the vibration components whose rotational order is $n_a$ and the vibration components whose rotational order is $n_b$ can be obtained by analyzing the tire vibrations detected by the acceleration sensor 11 by the rotational order ratio analyzing means 14. And this makes it possible to estimate whether the contact patch shape of the tire 20 has neared the tire contact patch shape $F_a$ or the tire contact patch shape $F_b$.

Figure 5:
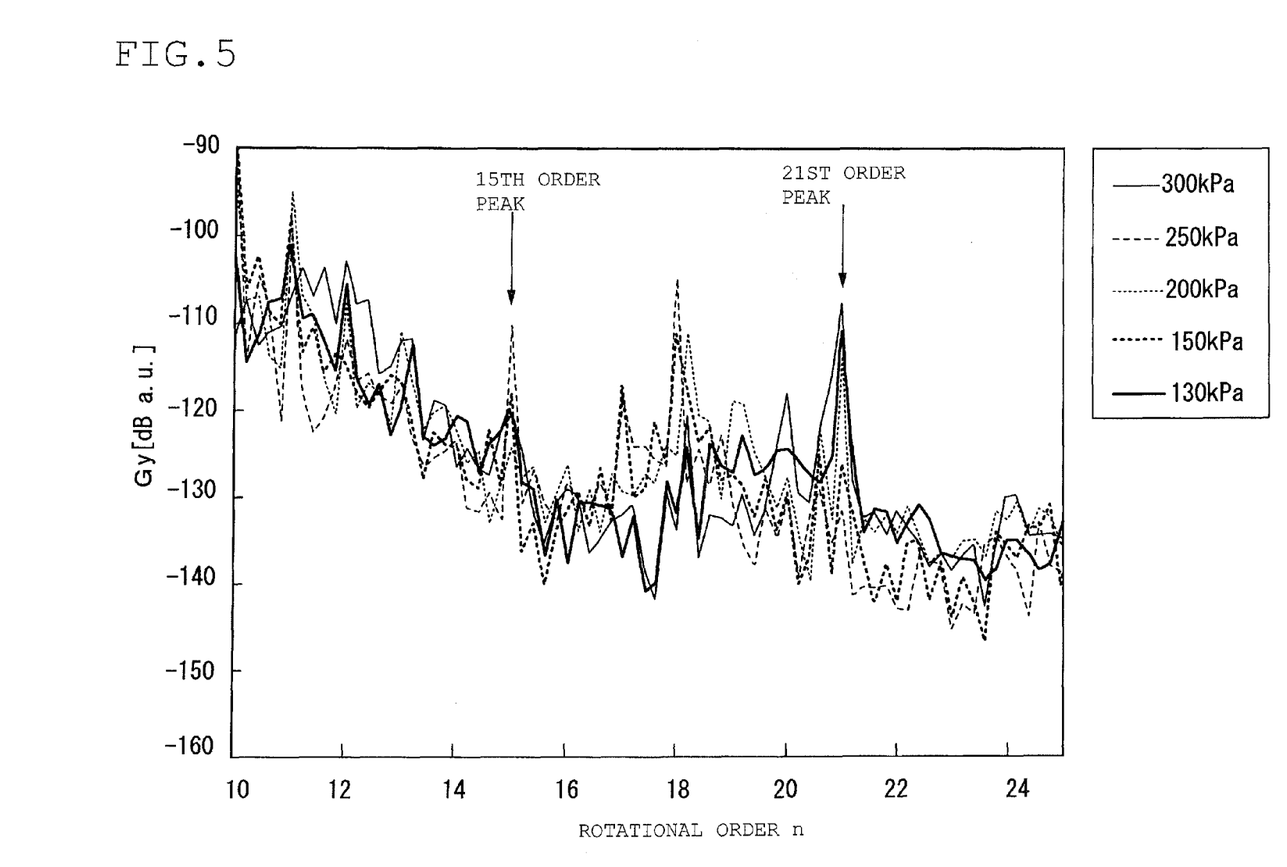
FIG. 5 is a diagram showing an example of rotational order spectrums derived by performing a rotational order ratio analysis on the vibrations of an unsprung member of a vehicle.

FIG. 5 is a diagram showing rotational order spectrums derived by performing a rotational order ratio analysis on the vibrations of an unsprung member of a vehicle. For the measurement of the vibrations, the vehicle fitted with the tire 20 was operated with various internal pressures on a smooth road surface of dry asphalt at a speed of 50 km/h. In the diagram, the rotational order spectrum in fine solid line is for the tire internal pressure of 300 kPa, one in fine broken line for the tire internal pressure of 250 kPa, one in fine dotted line for the tire internal pressure of 200 kPa, one in bold broken line for the tire internal pressure of 150 kPa, one in fine broken line for the tire internal pressure of 250 kPa, and one in bold solid line for the tire internal pressure of 130 kPa. Note that the load employed was a normal load of 5000 N.

The peak near the 15th order as shown in the diagram is the peak corresponding to the occurrence of 15 vibrations for a single revolution of the tire, which corresponds to the pitch $P_a$ of the sipe row 25A. Also, the peak of the 21st order is the peak corresponding to the occurrence of 21 vibrations for a single revolution of the tire, which corresponds to the pitch $P_b$ of the sipe row 25B.

When the tire vibrations detected by the acceleration sensor 11 are sampled at constant time intervals, the rotation intervals can be rendered uneven due to speed fluctuation. However, rotational order spectrums can be obtained without performing a sampling at constant rotation intervals if a technique, such as the Lomb-Scargle periodgram (Scargle J. D., 1982, The Astrophysical Journal, 268,875) is used to estimate vibration spectrums from data sampled at uneven intervals.

The contact patch shape estimating means 17 estimates the contact patch shape of a moving tire 20 by comparing the vibration levels of the peaks corresponding to the respective rotational orders $n_a$ and $n_b$ extracted by the rotational order components extracting means 16 against the predetermined threshold values $K_a$ and $K_b$.

Figure 6:
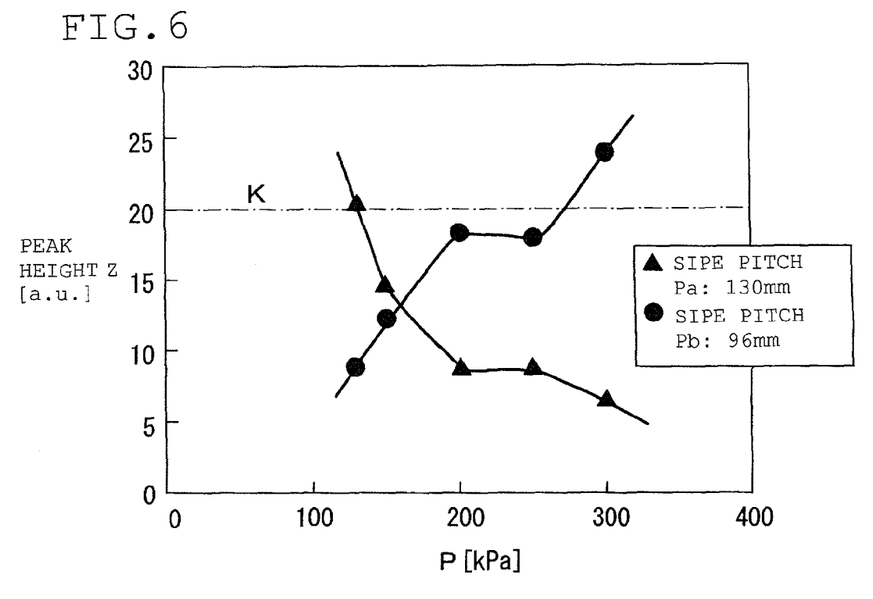
FIG. 6 is a diagram showing the relations between the peak heights corresponding to the pitches of sipe rows and the tire internal pressure.

FIG. 6 is a diagram showing the relations of the tire internal pressure with a peak height which is the peak value of vibration corresponding to the pitch $P_a$ and another peak height which is the peak value of vibration corresponding to the pitch $P_b$. The horizontal axis of the diagram represents the tire internal pressure [kPa], and the vertical axis the peak height [a. u.].

The peak height $Z_a$ corresponding to the pitch $P_a$ indicated by Δ in the diagram shows a tendency of decreasing with the increase of tire internal pressure, remaining nearly constant in the neighborhood of 200 kPa, which is the normal internal pressure of the tire, and decreasing again beyond the tire internal pressure of 300 kPa.

On the other hand, the peak height $Z_b$ corresponding to the pitch $P_b$ indicated by ● in the diagram shows a tendency of increasing with the increase of tire internal pressure, remaining nearly constant in the neighborhood of 200 kPa, which is the normal internal pressure of the tire, and increasing again beyond the tire internal pressure of 300 kPa.

Suppose the threshold value is set at K=20, for instance. Then it, can be estimated that when the peak height $Z_a$ is below the threshold value K, the contact patch length L is getting close to the contact patch length $L_a$ of the tire contact patch shape $F_a$ set as the use limit due to internal pressure drop or load increase.

Also, it can be estimated that when the peak height $Z_b$ rises above the threshold value K, the contact patch length L is getting close to the contact patch length $L_b$ of the tire contact patch shape $F_b$ set as the use limit due to internal pressure rise or load decrease.

When it is estimated that the contact patch length L is now about the contact patch length $L_a$ or the contact patch length $L_b$, the contact patch shape estimating means 17 outputs to the alarm means 18 a signal indicating the approach of the contact patch shape of the tire to one of the predetermined allowable limits ($L_b \le L \le L_a$).

The alarm means 18 may be installed near the driver's seat. When the signal indicating the approach of the tire contact patch shape to a predetermined allowable limit is inputted, the alarm means 18 warns the driver of the abnormality of the tire contact patch shape by lighting or flashing the warning LED. In doing so, it is preferable if the alarm means 18 warns the driver simultaneously of which of the larger and the smaller contact patch length L the abnormality represents by a change in color of the warning LED or the like. The arrangement may also be such that the warning is given by an alarm sound of a warning buzzer or by a combination of a warning buzzer and LED.

Next, a description will be given of a method for estimating the contact patch shape of a tire according to the present embodiment.

First the tire 20, which has the sipe rows 25a, 25b formed in the left and right shoulder lands 24a, 24b at the pitches $P_a$ and $P_b$ of sipes 25a, 25b extending circumferentially, is fitted on the wheel 32. Then the vibration waveforms of the tire 20 transmitted to an unsprung member of the vehicle are detected by the acceleration sensor 11 attached to the knuckle 31, and at the same time the wheel speed is detected by the wheel speed sensor 12.

Next, a rotational order ratio analysis is performed on the vibration waveforms of the tire 20 by the rotational order ratio analyzing means 14 to obtain the rotational order spectrums with the horizontal axis representing the rotational order as shown in FIG. 5.

The rotational order spectrums are obtained by sampling the tire vibrations detected by the acceleration sensor 11 according to the pulse signals of wheel speed outputted from the rotation signal generating means 13 and then performing an FFT thereon.

Then the peak height $Z_a$ which is the peak value of vibration of rotational order $n_a$ corresponding to the pitch $P_a$ and the peak height $Z_b$ which is the peak value of vibration of rotational order $n_b$ corresponding to the pitch $P_b$ are extracted by the rotational order components extracting means 16.

In the estimation of the contact patch shape of a tire, the peak height $Z_a$ derived from the rotational order spectrum is compared with the predetermined threshold value K to estimate whether the contact patch shape of the moving tire is getting close to the contact patch length $L_a$ of the tire contact patch shape $F_a$ set as the use limit due to internal pressure drop or load increase, and also the peak height $Z_b$ is compared with the threshold value K to estimate whether the contact patch shape is getting close to the contact patch length $L_b$ of the tire contact patch shape $F_b$ set as the use limit due to internal pressure rise or load decrease. In this manner, it is possible to accurately estimate whether the contact patch shape of a moving tire 20 is within the predetermined range ($L_b \leq L \leq L_a$) or not.

In case where the contact patch shape of the tire 20 is outside the predetermined range, the driver is warned of the abnormality of the tire contact patch shape by lighting or flashing the warning LED.

According to the present embodiment, therefore, the vibration waveforms of a tire 20, which has sipe rows 25A, 25B formed in the left and right shoulder lands 24a, 24b at the pitches $P_a$ and $P_b$ of sipes 25a, 25b extending circumferentially are detected by an acceleration sensor 11 attached to a knuckle 31. The rotational order spectrums are obtained by performing a rotational order analysis on the vibration waveforms. The peak height $Z_a$, which is the peak value of vibration of the rotational order $n_a$ corresponding to the pitch $P_a$, and the peak height $Z_b$, which is the peak value of vibration of the rotational order $n_b$ corresponding to the pitch $P_b$, are extracted from the rotational order spectrums. And the peak height $Z_a$ is compared with the predetermined threshold value K to estimate whether the contact patch shape of the tire is getting close to the contact patch length $L_a$ of the tire contact patch shape $F_a$ set as the use limit due to internal pressure drop or load increase, and also the peak height $Z_b$ is compared with the threshold value K to estimate whether the contact patch shape is getting close to the contact patch length $L_b$ of the tire contact patch shape $F_b$ set as the use limit due to internal pressure rise or load decrease. Thus, it is possible to estimate with accuracy whether the contact patch shape of a running tire 20 is within the predetermined range ($L_b \leq L \leq L_a$) or not.

Also, the arrangement is such that when the contact patch shape of the tire 20 is estimated to be outside the predetermined range, the driver is warned of the abnormality of the tire contact patch shape by raising an alarm. This will improve the running safety of the vehicle.

In the foregoing embodiment, the tire 20 used has sipe rows 25A, 25B formed at their respective pitches $P_a$ and $P_b$ in the left and right shoulder lands 24a, 24b. However, a sipe row 25A of the pitch $P_a$ may be provided in one of the shoulder lands 24b only. Or the sipe row 25A of the same pitch $P_a$ may be provided in each of the left and right shoulder lands 24a, 24b.

It should be noted that when a single sipe row or a single pitch is to be used, it is preferable from the viewpoint of running safety that the above-mentioned sipe row 25A having the same pitch as the contact patch length $L_a$ of the tire contact patch shape $F_a$ set as the use limit due to internal pressure drop or load increase is provided.

Also, the location of the sipe rows is not limited to the left and right shoulder lands 24a, 24b. Instead, the sipe rows may be provided in the middle lands 23a to 23c. However, it is preferable for the accuracy of measurement that the sipe rows are located in the shoulder lands 24a, 24b which are subject to larger variation of the tire contact patch shape.

Also, in the foregoing embodiment, the peak height $Z_a$ of the rotational order $n_a$ corresponding to the pitch $P_a$ is compared with the threshold value K to estimate whether the contact patch length L is getting close to the contact patch length $L_a$. At the same time, the peak height $Z_b$ of the rotational order $n_b$ corresponding to the pitch $P_b$ is compared with the threshold value K to estimate whether the contact patch length L is getting close to the contact patch length $L_b$. However, the arrangement may be such that the peak height ratio $R=(Z_a/Z_b)$, which is the ratio of the peak height $Z_a$ to the peak height $Z_b$, is used to estimate whether the contact patch shape of the tire 20 is within the predetermined range.

Figure 7:
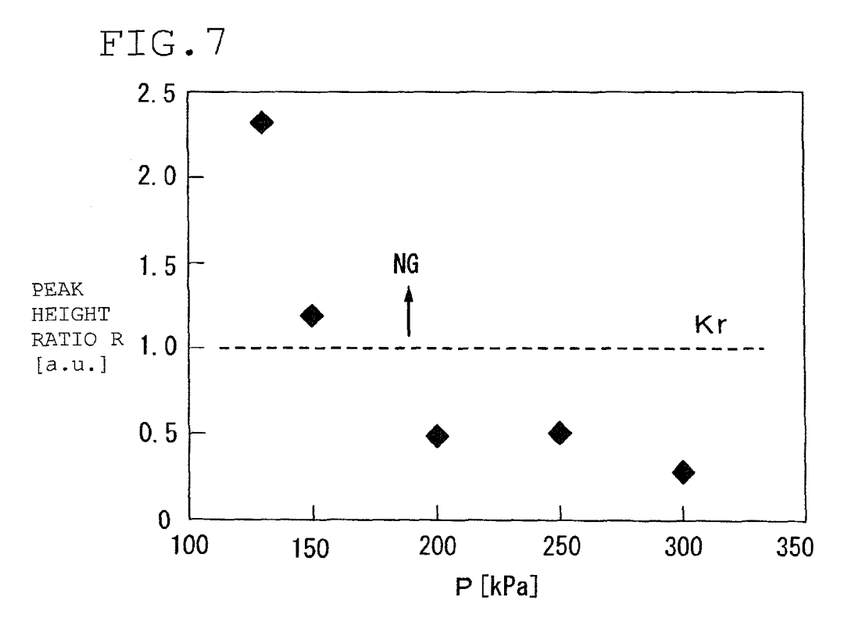
FIG. 7 is a diagram showing the relations between the peak height ratios and the tire internal pressure.

That is, as shown in FIG. 7, the peak height ratio R monotonically decreases with the increase in tire internal pressure. Therefore, by setting a threshold value $K_r$ relative to the peak height ratio R, it is possible to estimate whether the contact patch shape of the tire 20 is within the predetermined range. For example, with the threshold value $K_r$ set to 1, the peak height ratio R above 1 may be estimated to indicate a lowered internal pressure or a load to heavy for the internal pressure.

Figure 8A:
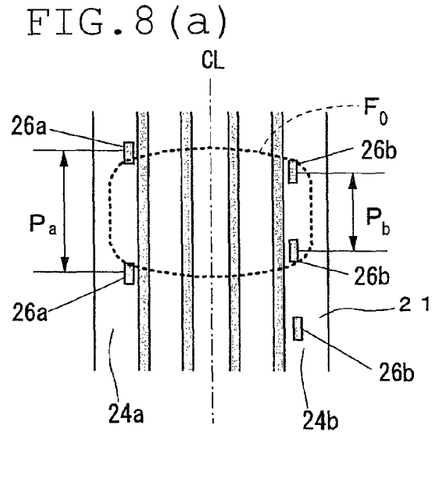
FIG. 8 is illustrations showing other examples of circumferentially extending recesses formed in the tread of a tire according to the present invention.
Figure 8B:
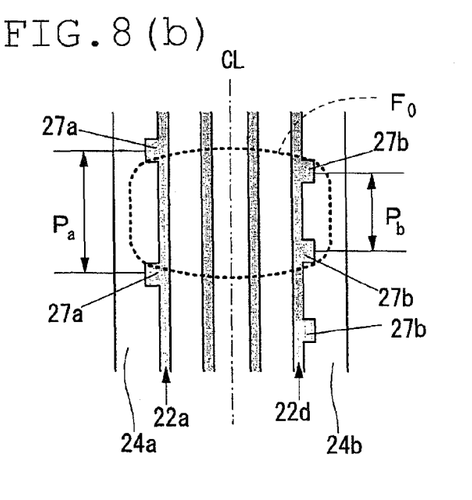

Also, the recesses extending circumferentially are not limited to sipes 25a, 25b provided in the left and right shoulder lands 24a, 24b. They may be grooves 26a, 26b provided in the shoulder land 24a and the shoulder land 24b as illustrated in FIG. 8A. Or they may be grooves 27a open to the circumferential groove 22a or grooves 27b open to the circumferential groove 22d as illustrated in FIG. 8B.

Figure 8C:
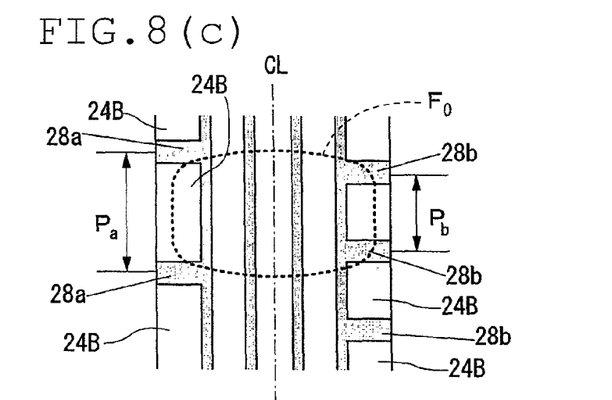

Or they may be lateral grooves 28a, 28b defining shoulder blocks 24B as illustrated in FIG. 8C.

Also, in the foregoing embodiment, the contact patch shape of the tire is estimated using the relations of the vibration level of the peak corresponding to the pitch $P_a$ and the vibration level of the peak corresponding to the pitch $P_b$ with the tire internal pressure as shown in FIG. 6. However, it is also possible to estimate the contact patch shape of the tire by preparing a graph with the horizontal axis representing the tire contact patch shape. That is, as shown in FIG. 12, the change in tire contact patch shape shows similar tendencies between the case of the internal pressure rising and the case of the load decreasing. Also, it shows similar tendencies between the case of the internal pressure dropping and the case of the load increasing. For example, the contact patch shape assumes the same shape (same contact patch length) for "200 kPa, 4 kN" and "250 kPa, 5 kN". Likewise, the contact patch shape assumes the same shape (same contact patch length) for "200 kPa, 6 kN" and "150 kPa, 5 kN".

In other words, the contact patch area of a tire will decrease if the load is too light for the tire internal pressure, whereas it will increase if the load is too heavy for the tire internal pressure. Accordingly, the contact patch shape of a tire can be estimated by preparing a graph with the horizontal axis representing the tire contact patch shape classifying it into a plurality of levels or preparing a correspondence table of the vibration level of the peak corresponding to the pitch $P_a$ and the tire contact patch shape. Or the contact patch shape of a tire may be estimated by preparing a graph with the horizontal axis representing the tire contact patch area or a correspondence table of the vibration level of the peak corresponding to the pitch $P_a$ and the tire contact patch area.

Also, in the foregoing embodiment, the contact patch shape of a tire is estimated from the contact patch length L. However, it is possible to estimate the contact patch shape of a tire from both the contact patch length L and contact patch width W.

Figure 9:
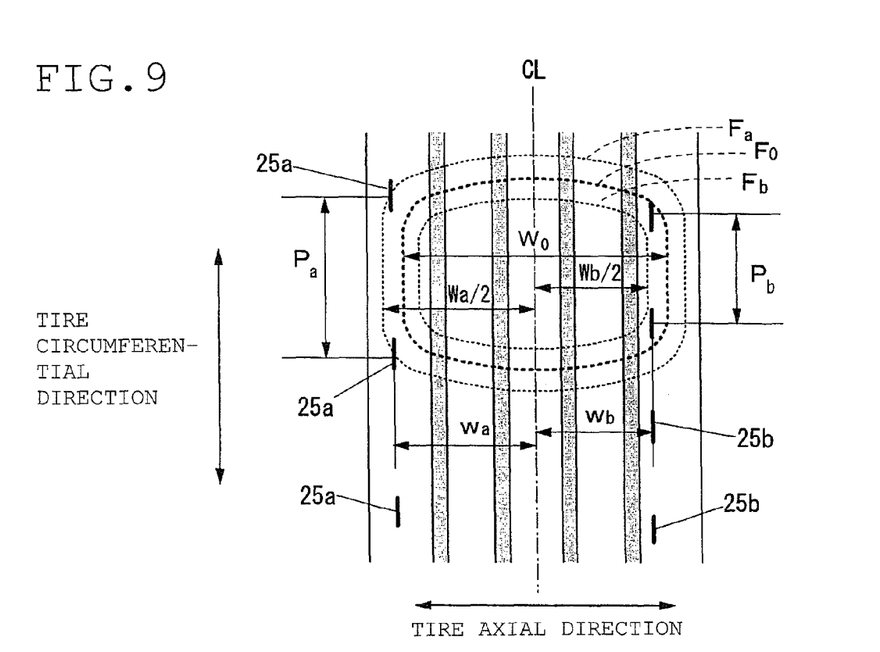
FIG. 9 is an illustration showing another example of tread pattern of a tire having sipe rows formed at regular pitches according to the present invention.

More specifically, the distance $w_a$ of the sipe row 25A from the center line CL denoting the tire equatorial surface is set wider than a half of the contact patch width $W_0$ at normal internal pressure and normal load and at the same time narrower than a half of the contact patch width $W_a$ of the tire contact patch shape $F_a$ as shown in FIG. 9. Thus it is possible to estimate with greater accuracy whether the tire contact patch shape has reached the tire contact patch shape $F_a$, because the sipe row 25A is always outside the contact patch until the tire contact patch shape reaches the tire contact patch shape $F_a$ and crosses the edge of the tire contact patch only when he tire contact patch shape has reached the tire contact patch shape $F_a$.

In a similar manner, if the distance $w_b$ of the sipe row 25B from the center line CL denoting the tire equatorial surface is set narrower than a half of the contact patch width $W_0$ at normal internal pressure and normal load and at the same time wider than a half of the contact patch width $W_b$ of the tire contact patch shape $F_b$, the sipe row 25B is always inside the contact patch until the tire contact patch shape reaches the tire contact patch shape $F_b$ and crosses the edge of the tire contact patch only when he tire contact patch shape has reached the tire contact patch shape $F_b$. Thus it is also possible to estimate with greater accuracy whether the tire contact patch shape has reached the tire contact patch shape $F_b$.

Figure 10:
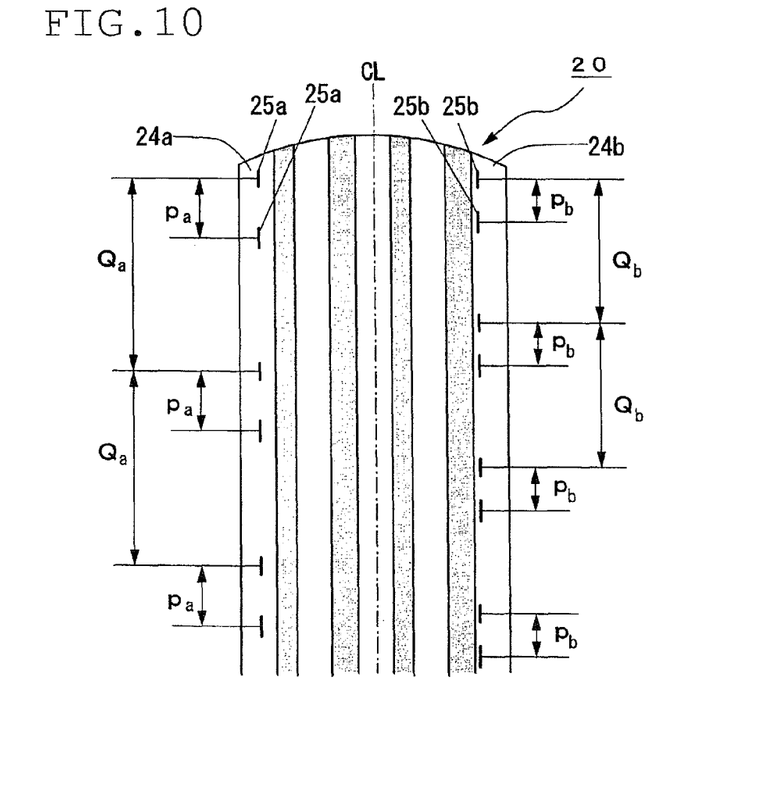
FIG. 10 is an illustration showing another example of tread pattern of a tire having sipe pairs (circumferential sipe pairs) formed at regular pitches according to the present invention.

Also, in the foregoing embodiment, sipe rows 25A, 25B are provided in such a manner that circumferentially extending sipes 25a, 25b are arranged respectively at the pitches Pa and Pb in the shoulder lands 24a, 24b. However, as illustrated in FIG. 10, a similar effect can be achieved if sipe pairs 25a, 25a, each pair consisting of two sipes the same interval $p_a$ as the pitch $P_a$ circumferentially apart from each other, arranged at a pitch $Q_a$ along the tire circumference and sipe pairs 25b, 25b, each pair consisting of two sipes the same interval $P_b$ as the pitch $P_b$ apart from each other, arranged at a pitch $Q_b$ along the tire circumference. It should be noted that in this case, the peak heights to be extracted from the rotational order spectrums are peak heights $z_a$ and $z_b$ of the rotational orders corresponding to the pitches $Q_a$ and $Q_b$.

Figure 11A:
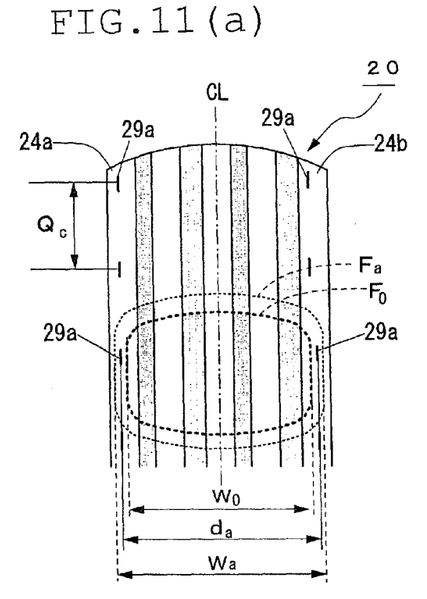
FIG. 11 is illustrations showing other examples of tread pattern of a tire having sipe pairs (axial sipe pairs) formed at a regular pitch according to the present invention.
Figure 11B:
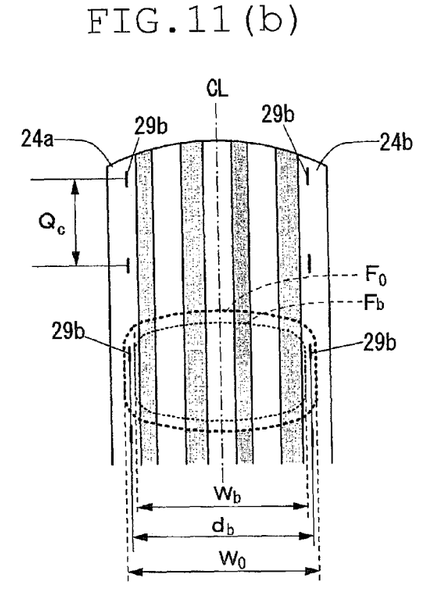

Also, as illustrated in FIGS. 11A and 11B, the contact patch shape of a tire can be estimated by arranging a pair of sipes 29a, 29a (a pair of sipes 29b, 29b), each pair consisting of two sipes a predetermined interval $d_a$ (or interval $d_b$) axially apart from each other, at a pitch $Q_c$ along the tire circumference.

If an interval $d_a$ which is wider than the contact patch width $W_0$ at normal internal pressure and normal load and also narrower than the contact patch width $W_a$ of the tire contact patch shape $F_a$ is set as the predetermined interval, then it is possible to estimate with greater accuracy whether the tire contact patch shape has reached the tire contact patch shape $F_a$, because the sipe pair 29a, 29a is always outside the contact patch and crosses the edge of the tire contact patch only when the tire contact patch shape has reached the tire contact patch shape $F_a$.

Also, if an interval $d_b$ which is narrower than the contact patch width $W_0$ at normal internal pressure and normal load and also wider than the contact patch width $W_b$ of the tire contact patch shape $F_b$ is set as the predetermined interval, then it is possible to estimate with greater accuracy whether the tire contact patch shape has reached the tire contact patch shape $F_b$, because the sipe pair 29b, 29b is always inside the contact patch and crosses the edge of the tire contact patch only when the tire contact patch shape has reached the tire contact patch shape $F_b$.

It should be noted that in this case, the peak height to be extracted from the rotational order spectrums is the peak height $z_c$ of the rotational order corresponding to the pitch $Q_c$.

Also, in the foregoing embodiment, the output of the wheel speed sensor 12 is sent to the rotation signal generating means 13 to generate a pulse signal, and this pulse signal is outputted as the sampling clock to the rotational order ratio analyzing means 14. However, it is preferable that the wheel speed is obtained from a vehicle control means. Such an arrangement may make the system more simplified.

Also, in the foregoing embodiment, the peak height $Z_a$ of rotational order $n_a$ corresponding to the pitch $P_a$ and the peak height $Z_b$ of rotational order $n_b$ corresponding to the pitch $P_b$ are obtained from the rotational order spectrums. However, frequency spectrums may be obtained by performing an FFT on the vibration waveforms of tire vibrations, which are the output of the acceleration sensor 11, and the vibration component $Y_a$ of the frequency $f_a$ corresponding to the pitch $P_a$ and the vibration component $Y_b$ of the frequency $f_b$ corresponding to the pitch $P_b$ may be derived from the frequency spectrums so as to estimate the contact patch shape of the tire 20. In this case, however, the frequency $f_a$ and the frequency $f_b$, which change with the wheel speed, must be calculated using the pitch $P_a$, the pitch $P_b$, and the wheel speed.

EXAMPLE

A tire of size 225/45R17 having 20 mm-long circumferential sipes formed equally spaced in the left and right shoulder portions around the whole circumference was prepared. A tire contact patch shape estimating apparatus according to the present invention was mounted on a vehicle fitted with this tire. And unsprung vibrations were measured with this vehicle operated at a speed of 50 km/h on a smooth road surface. In the test, the tire internal pressure was changed from 300 kPa to 250 kPa to 200 kPa, and to 150 kPa and 130 kPa.

The depth of the circumferential sipes was 8 mm, and two kinds of pitches, namely, 96 mm and 130 mm, were used.

The amplitude of the vibration peak was obtained by measuring the height of the vibration peak of the order corresponding to the pitch from the rotational order spectrum of unsprung vibrations. The vibration of the pitch of 96 mm corresponds to the peak near the 21st rotational order, whereas the vibration of the pitch of 130 mm corresponds to the peak near the 15th rotational order.

As shown in FIG. 6, the vibration peak corresponding to the pitch of 130 mm lowers with the rise in internal pressure, whereas the vibration peak corresponding to the pitch of 96 mm rises with the rise in internal pressure.

Therefore, if a proper threshold value (e.g., 20) is set in the graph of FIG. 6, it is possible to determine whether the tire has a proper contact patch shape or not.

Also, as shown in the graph of FIG. 7, a proper threshold value (e.g., 1) may be set upon deriving the relationship between the ratio of the vibration peak corresponding to the pitch of 130 mm to the vibration peak corresponding to the pitch of 96 mm and the internal pressure. Then it is possible to determine whether the tire has a proper contact patch shape or not.

In this manner, the vibrations of a tire having circumferentially extending recess pairs, each pair consisting of two recesses the same length as the predetermined contact patch length apart from each other, which are arranged at a regular pitch circumferentially about the tire may be detected. Then the vibration components corresponding to the pitch may be extracted, and the contact patch shape of the tire may be estimated. And it has been confirmed that such a method accomplishes an accurate determination of whether the tire has a proper contact patch shape or not.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

INDUSTRIAL APPLICABILITY

As described above, the present invention presents a tire contact patch shape estimating apparatus capable of accurately estimating the contact patch shape of a moving tire. This will enable accurate grasp of the state of a tire, such as one supporting a too heavy load for the tire internal pressure, thereby improving the running safety of a vehicle.

DESCRIPTION OF REFERENCE NUMERALS 10 tire contact patch shape estimating apparatus
11 acceleration sensor
12 wheel speed sensor
13 rotation signal generating means
14 rotational order ratio analyzing means
14a lowpass filter
14b sampling means
14c analyzing means
15 storage means
16 rotational order components extracting means
17 contact patch shape estimating means
18 alarm means
20 tire
21 tread
22a-22d circumferential groove
23a-23c middle land
24a, 24b shoulder land
25A, 25B sipe row
25a, 25b sipe
30 wheel assembly
31 knuckle
32 wheel
33 wheel hub
34 suspension member
35, 36 arm
37, 38 shock-absorbing member

The invention claimed is:

1. A method for estimating the contact patch shape of a tire, comprising the steps of:
    detecting vibrations of the tire which has a circumferential row of recesses in the tire tread arranged at the same pitch as a predetermined contact patch length;
    extracting rotational order components corresponding to the pitch from the vibrations of the tire; and
    estimating the contact patch shape of the tire from the magnitude of the rotational order components.

2. The method for estimating the contact patch shape of a tire according to claim 1, wherein the distance between the row of recesses and the center of tire width is wider than a half of the contact patch width at normal internal pressure and normal load and at the same time narrower than a half of a predetermined contact patch width at low internal pressure and high load.

3. The method for estimating the contact patch shape of a tire according to in claim 1, wherein the distance between the row of recesses and the center of tire width is narrower than a half of the contact patch width at normal internal pressure and normal load and at the same time wider than a half of a predetermined contact patch width at high internal pressure and low load.

4. The method for estimating the contact patch shape of a tire according to claim 1, wherein there are two or less recesses present within a predetermined contact patch length.

5. The method for estimating the contact patch shape of a tire according to claim 1, wherein two rows of recesses having different pitches each other are provided at pitches different from each other.

6. The method for estimating the contact patch shape of a tire according to claim 5, wherein recesses of one of the recess rows are all located inside the contact patch and recesses of the other of the recess rows are all located outside the contact patch at normal internal pressure and normal load.

7. The method for estimating the contact patch shape of a tire according to claim 1, wherein the recesses are circumferentially extending sipes formed in the shoulder region of the tire.

8. The method for estimating the contact patch shape of a tire according to claim 1, wherein the vibrations of the tire are detected at an unsprung portion of the vehicle.

9. The method for estimating the contact patch shape of a tire according to claim 1, wherein rotational order components are frequency components.

10. An apparatus for estimating the contact patch shape of a tire which has a circumferential row of recesses in the tire tread arranged at the same pitch as a predetermined contact patch length, the apparatus comprising:
    a vibration detecting means installed on an unsprung portion of the vehicle for detecting the vibrations of the tire being transmitted thereto;
    a rotational order component extracting means for extracting rotational order components corresponding to the pitch from the vibrations of the tire; and
    a contact patch shape estimating means for estimating the contact patch shape of the tire based on the amplitude of the rotational order components.

11. An apparatus for estimating the contact patch shape of a tire according to claim 10, further comprising a determination means for determining abnormality of the contact patch shape of the tire by comparing the estimated shape of the contact patch with a predetermined standard shape of the contact patch, and an alarm unit for emitting an alarm when the determination means has determined abnormality.

12. A method for estimating the contact patch shape of a tire, comprising the steps of:
    detecting vibrations of the tire which has a plurality of recess pairs in the tire tread, each pair composed of two recesses at the same interval as a predetermined contact patch length, the recess pairs arranged at a regular pitch along the tire circumference;
    extracting rotational order components corresponding to the pitch of the recess pairs from the vibrations of the tire; and
    estimating the contact patch shape of the tire from the amplitude of the rotational order components.

13. A method for estimating the contact patch shape of a tire, comprising the steps of:
    detecting vibrations of the tire which has recesses circumferentially arranged in the same positions as predetermined edges of a contact patch in the tire tread at a regular pitch along the tire circumference;
    extracting rotational order components corresponding to the pitch of the recesses from the vibrations of the tire; and
    estimating the contact patch shape of the tire from the amplitude of the rotational order components.

* * * * *